3,836,617
PROCESS OF PRODUCING A FOAMED POLYSTYRENE RESIN MOLDED PRODUCT

Jay A. Lankheet, 1329 Bayview Drive, Holland, Mich. 49423
No Drawing. Filed Dec. 15, 1972, Ser. No. 315,335
Int. Cl. B29d 27/00
U.S. Cl. 264—51                                    4 Claims

ABSTRACT OF THE DISCLOSURE

A process for producing strong, lightweight, cellular molded products in which a mixture of expandable polystyrene beads, fine particles of inorganic material, water, thermosetting polyester resin and catalyst is heated to expand the beads and cure the resin.

---

This invention relates to substantially rigid cellular molded products and a process for preparing same.

Various types of molded products have been made by placing a molding composition comprising expandable polystyrene beads together with a bonding resin into a mold and then heating the contents of the mold to cause expansion of the beads and bonding of the resultant expanded beads to each other by means of the bonding resin. Conventionally, the bonding resin is a thermoplastic resin and the resulting products are low density and relatively compressible and are suitable for relatively light duty purposes, for which prolonged durability, weather-resistance, strength, etc. of the molded products are not essential requirements.

It is an object of the present invention to provide substantially rigid cellular molded products comprising expanded polystyrene beads which are bonded together by means of a substantially non-cellular, thermosetting resin, which products are inexpensive to manufacture, strong, lightweight, and durable so that they can be used for various structural and/or decorative purposes.

It is a further object of this invention to provide an improved method of manufacturing an expanded polystyrene foamed article wherein the major portion of the total volume of the article consists of expanded polystyrene beads, but wherein there is provided a substantially rigid matrix of thermosetting resin to provide a substantially rigid cellular molded product of the aforementioned type.

According to the present invention, there is provided a substantially rigid cellular molded product consisting essentially of expanded polystyrene beads which are bonded together by a matrix of non-cellular thermosetting polyester resin and also containing therein fine particles of inorganic material selected from the group consisting of calcium carbonate, portland cement and mixtures thereof.

In accordance with the present invention, there is prepared a thickly viscous, but flowable and moldable, homogenous mixture (A) consisting essentially of:

(1) from about 15–35% by weight of expandable polystyrene beads;
(2) from about 40–70% by weight of fine particles of inorganic material selected from the group consisting of calcium carbonate, portland cement and mixtures thereof; and
(3) from about 15–40% by weight of water, to make 100% by weight of mixture (A).

Then, to mixture (A) there is promptly added catalyst and from about 30 to 150% by weight, based on the weight of mixture (A), of general purpose liquid polyester resin for curing the resin. The materials are mixed to form a homogenous moldable composition which is then poured into a mold or molds.

Alternatively, mixture (A), the catalyst and the polyester resin can be mixed together in a mixing spray gun, of the type used for spraying glass fiber-resin mixtures. The spray of the mixed materials can be directed against surfaces of various backing materials, such as acrylic sheets, to form a layer thereon.

If desired, there can be incorporated in the moldable composition, for either casting or spraying from 10–30% by weight, based on the total weight of the moldable composition, of a fibrous reinforcing material such as glass staple fibers.

The composition, molded by either of the foregoing techniques, is cured by heating to a temperature in the range of from about 225° F. to about 450° F., the heating being continued until the moldable composition is substantially rigidified. This curing normally takes from about 2 to 5 minutes for molded products of up to a maximum thickness of about 2 inches. During the aforementioned curing process, the polystyrene beads expand so that the final molded product consists of cells of expanded polystyrene uniformly dispersed in a rigid matrix or binder of the thermoset, non-cellular polyester resin. The inorganic materials are uniformly dispersed in the polyester resin matrix and they function in the final molded product essentially as fillers. The fibrous reinforcing material, if used, is also uniformly dispersed in the final molded product and it improves the flexural strength thereof. During the curing, the volume of the moldable composition increases substantially, normally up to a volume of about 200% of the volume of the composition prior to molding.

The starting polystyrene material is thermally expandable polystyrene which is commercially available in bead or pellet form in sizes ranging from about 10 to 80 mesh. A volatile blowing agent is incorporated in such commercially available polystyrene beads by the manufacturer thereof. Suitable blowing agents are well known and include, for example, low boiling hydrocarbons such as pentane, hexane, petroleum ethers and the like. The starting polystyrene particles are in an unexpanded condition because the molding process can be performed more effectively and the properties of the molded products are better when unexpanded beads, as distinguished from pre-expanded beads, are used.

The polyester resins useful in the practice of this invention are conventional thermosetting general purpose liquid polyester resins which are capable of being heat set to form rigid products. Such resins are conventionally used as hand lay-up resins for preparing fiberglass-polyester molded products. As is well known, these resins are prepared by reacting one or more hydroxyl-bearing compounds, either di- or polyhydric, with one or more saturated dibasic or dicarboxylic acids or their anhydrides, together with one or more reactive monomers. These constituents, when incorporated with a catalyst and heated, form a cross-linked, thermosetting polymer. It is preferred to use these components in the following approximate formulation to make a general purpose polyester:

|  | Moles |
|---|---|
| Hydroxyl components | 2.2 |
| Saturated acids | 1.0 |
| Unsaturated acids | 1.0 |
| Monomers | 1.0–1.5 |

The respective components of the polyester formulation can be selected from materials known to be suitable for this purpose.

A typical satisfactory formulation of the polyester resin

| | Moles |
|---|---|
| Propylene glycol | 2.2 |
| Hexahydrophthtalic acid | 0.6 |
| Tetrahydrophthalic acid | 0.4 |
| Chlorofumaric acid | 1.0 |
| Styrene | 0.2 |
| Chlorostyrene | 0.6 |
| Acrylates and/or methacrylates | 0.4 |

The present invention is not concerned with the details of the formulation of the polyester resin and any general purpose polyester resin capable of being heat set to form a rigid product can be used.

A catalyst is mixed with the polyester resin and with the above-mentioned mixture of the polystyrene beads, inorganic particles and water. The catalyst used can be selected from the conventional catalysts known to be suitable for use with polyester resins in order to rigidify same. The conventional catalyst, methylethyl ketone peroxide in diethyl phthalate, is highly satisfactory and is preferred for the purposes of the present invention because of its low cost and ready availability. The amount of catalyst used is in the range of from about 1 to 2% by weight, based on the weight of the polyester resin.

The polyester resin can also contain, if desired, various conventional optional additives, such as stabilizers, promoters, pigments and the like. These can be used in the amounts conventionally used in the art of molding polyester resins. Since the present invention is not concerned with such materials, further description is believed to be unnecessary.

The molding composition also contains fine particles of inert, inorganic substance selected from the group consisting of calcium carbonate, preferably in the form of marble dust, portland cement and mixtures thereof. These substances are effective in the process according to the present invention as dispersing aids to maintain the polystyrene beads in a dispersed state in the polyester resin during molding and curing. They also appear to increase the amount of expansion of the polystyrene beads. In the final molded product, they are effective essentially as inert filler materials. It is to be noted that curing of the cement particles does not appear to occur to an appreciable extent due to the speed of the curing treatment. The inorganic substances used are low in cost and relatively lightweight, thus making it possible to produce inexpensively, relatively low density products. It is preferred to use a mixture of about equal parts by weight of portland cement and marble dust for the purposes of the present invention. The particle size of the inert, inorganic substance or substances preferably is smaller than about 100 mesh (U.S. Sieve).

The water is used in the mixture (A) in an amount sufficient to make same thickly viscous. The water is also effective during the curing step to improve the foaming of the polystyrene beads. That is, during the curing step, the water is converted to steam throughout the entirety of the molded product and aids in transferring heat to the beads in order to cause expansion thereof. The water is essentially completely removed by vaporization during the curing process and water is not present in substantial amounts in the final molded product.

The process of the present invention is useable for making products of various structural shapes including rods, plates and complex configurations. The molded products have a pleasing appearance and can have a smooth or pebbley exterior surface. They can have various densities depending on the weight ratio of the ingredients employed in the molding composition. The polyester resin forms a rigid shape-retaining matrix for the polystyrene beads so that the molded products are essentially rigid. The molded products may be somewhat compressible if the amount of polystyrene beads is relatively high with respect to the amount of polyester resin. The molded products are highly weather-proof and are capable of withstanding appreciable loads and in this respect are distinguished from conventional foamed polystyrene products made using small amounts of binder. The products according to the invention are capable of being used to form decorative and/or structural members for withstanding light loads, such as copings and similar parts of swimming pools.

The invention is further described by reference to the following illustrative examples of procedures according to the invention.

In the following examples, unless otherwise indicated, all parts and percentages are to be taken by weight.

EXAMPLE 1

About 50 parts of expandable polystyrene beads, ranging in size between 16 and 40 mesh and containing about 6 percent by weight of pentane as blowing agent, are mixed with about 50 parts by weight of marble dust and about 50 parts of portland cement (both of a size passing through a 200 mesh sieve). To this dry mixture there is added and mixed about 60 parts water to form a relatively viscous but flowable mixture (A). About 100 parts of general purpose polyester resin containing about 2 parts of methyl ethyl ketone peroxide in diethyl phthalate as catalyst is added to and mixed the flowable mixture (A) to form a moldable composition. The composition is charged into open-topped molds and is heated at 300° F. for about 4 minutes. The molding composition expands to about twice its initial volume and rigidifies to form a monolithic cellular molded product in which the polystyrene beads are expanded and bonded to each other in a matrix of polyester resin. The foamed product has an attractive appearance, excellent uniformity and substantial strength, and is suitable for use as an exterior decorative ground surfacing material, such as patio blocks, and as a coping for swimming pool construction.

EXAMPLE 2

About 50 parts of the same expandable polystyrene beads employed in Example 1 are mixed with 135 parts by weight of the same marble dust and about 45 parts of water. Then 210 parts by weight of general purpose polyester molding resin containing about 4 parts by weight of methyl ethyl ketone peroxide in diethyl phthalate are added and mixed therein to form a moldable composition. The moldable composition is cast into molds and cured at about 450° F. for about 2½ minutes to cause foaming and rigidification. The molded product is heavier and stronger than the product of Example 1.

EXAMPLE 3

About 50 parts of the same expandable polystyrene beads employed in Example 1 are mixed with 40 parts of portland cement, 25 parts of marble dust and about 30 parts of water. This mixture is mixed with 50 parts of general purpose polyester molding resin containing about 1 part of methyl ethyl ketone peroxide in diethyl phthalate to form a moldable composition. This composition is cast into molds and is cured at about 350° F. for about 2½ minutes to obtain a foamed product. This product is more porous and lighter in weight than the product of the preceding examples and it has a noticeable resilient property.

EXAMPLE 4

About 6 parts of the same expandable polystyrene beads employed in Example 1 are mixed with 27 parts of marble dust and about 7 parts of water. This mixture, about 0.8 parts of methyl ethyl ketone peroxide in diethyl phthalate, an equal quantity of general purpose polyester resin (40 parts) and about 20 parts of glass fibers are fed to a mixing spray gun, are mixed therein and then sprayed therefrom, as a homogenous mixture, against an acrylic sheet (6 mil in thickness) to form a layer of about ⅛ inch thickness on said sheet. The coated sheet is then heated in an oven at about 300° F. for about 4 minutes. There is obtained a rigid boardlike product suitable for various decorative and structural purposes. The thickness of the foam layer is about ¼ inch. No shrinkage or perforation of the acrylic sheet occurs.

A variety of molded articles and structures can be obtained as products of the present invention. The molded products are essentially rigid and shape retaining. They can be employed as construction materials or for decorative purposes in the form of sheets, planks, blocks and rods, as well as various irregular shapes. They possess good insulating, vapor barrier and weather-proofness properties.

The embodiments of the invention in which an exclusive property or privilege is claimed are defined as follows:

1. A method of manufacturing a molded product, comprising:
   (I) molding a homogenous flowable molding composition consisting essentially of a viscous liquid dispersion of
      (A) (1) from about 15 to 35% by weight of expandable polystyrene beads of from about 10 to 80 mesh size, (2) from about 40 to 70% by weight of fine inorganic particles of smaller than about 100 mesh size selected from the group consisting of CaCO₃, portland cement and mixtures thereof, (3) from about 15 to 40% by weight of water, to make a total of 100% by weight of component A, and
      (B) from about 30 to about 150% by weight, based on the weight of component A, of liquid thermosetting polyester molding resin containing catalyst;
   (II) heating the molded composition to a temperature in the range of from 225 to 450° F., for from about 2 to 5 minutes, to cause expansion of the polystyrene beads and the formation of a rigid matrix of polyester resin bonding together said expanded polystyrene beads and said inorganic particles.

2. A method according to Claim 1, in which the composition is molded by casting it into a mold.

3. A method according to Claim 1, in which the composition is molded by spraying it against a backing member to form a layer thereon.

4. A method according to Claim 1, in which the molding composition contains from 10 to 30% by weight of reinforcing staple fibers.

References Cited

UNITED STATES PATENTS

| | | | |
|---|---|---|---|
| 3,100,678 | 8/1963 | Joiner et al. | 264—Dig. 7 |
| 3,023,136 | 2/1962 | Himmelheber et al. | 264—Dig. 7 |
| 2,806,509 | 9/1957 | Bozzacco et al. | 264—45 |
| 3,338,848 | 8/1967 | Hamilton | 264—Dig. 7 |
| 3,270,103 | 8/1966 | Kurtz | 264—45 |
| 3,025,202 | 3/1962 | Morgan et al. | 264—Dig. 7 |

MAURICE J. WELSH, JR., Primary Examiner

E. C. RZUCIDLO, Assistant Examiner

U.S. Cl. X.R.

260—2.5 B; 264—45, 53, Dig. 7